United States Patent [19]

Warne, Jr.

[11] 4,308,136
[45] Dec. 29, 1981

[54] INTERNALLY BAFFLED, HORIZONTAL FLOW, VERTICAL OIL SKIMMER

[75] Inventor: John P. Warne, Jr., Lake Charles, La.

[73] Assignee: Conoco Inc., Ponca City, Okla.

[21] Appl. No.: 117,680

[22] Filed: Feb. 1, 1980

Related U.S. Application Data

[62] Division of Ser. No. 890,773, Apr. 21, 1978, abandoned.

[51] Int. Cl.³ .............................................. B01D 17/04
[52] U.S. Cl. ..................... 210/114; 210/115; 210/128; 210/265; 210/519; 210/536; 210/540; 210/DIG. 5
[58] Field of Search ............ 210/23 R, 65, 73 W, 210/83, 84, 86, 104, 105, 128, 129, 519, 523, 533, 536, 535, 538, 540, DIG. 5, 114, 115, 121, 134, 143, 265, 304–307, 313

[56] References Cited

U.S. PATENT DOCUMENTS

| | | | |
|---|---|---|---|
| 1,947,709 | 2/1934 | Garrison et al. | 210/23 R |
| 2,083,861 | 6/1937 | Padgett | 210/312 |
| 2,125,722 | 8/1938 | Hawkins | 210/51 |
| 2,467,003 | 4/1949 | Bach | 210/55 |
| 2,610,698 | 9/1952 | Lovelady et al. | 210/23 R |
| 2,826,306 | 3/1958 | Burns | 210/533 X |
| 3,147,221 | 9/1964 | Johnston | 210/519 |
| 3,375,928 | 4/1968 | Chase | 210/114 |
| 3,794,583 | 2/1974 | Rhodes | 210/23 R |
| 3,907,682 | 9/1975 | Basseet | 210/114 |
| 3,933,654 | 1/1976 | Middelbeek | 210/521 |

FOREIGN PATENT DOCUMENTS 983555  2/1965  United Kingdom ................. 210/71

OTHER PUBLICATIONS

Perry, R. H. et al., Chemical Engineers' Handbook, Fifth Edition, 1973, McGraw-Hill Book Co., pp. 21-11 and 21-12.

Primary Examiner—Charles N. Hart
Assistant Examiner—David R. Sadowsky
Attorney, Agent, or Firm—A. Joe Reinert

[57] ABSTRACT

An internally baffled, horizontal flow, vertical oil separator or skimmer for the flotation and removal of oil from mixtures of oil and water has internal baffles that compel horizontal flow of a vertically elongated cross-section of fluid in the vertical vessel. The skimmer is of particular utility on offshore platforms where deck space is extremely expensive and limited.

2 Claims, 14 Drawing Figures

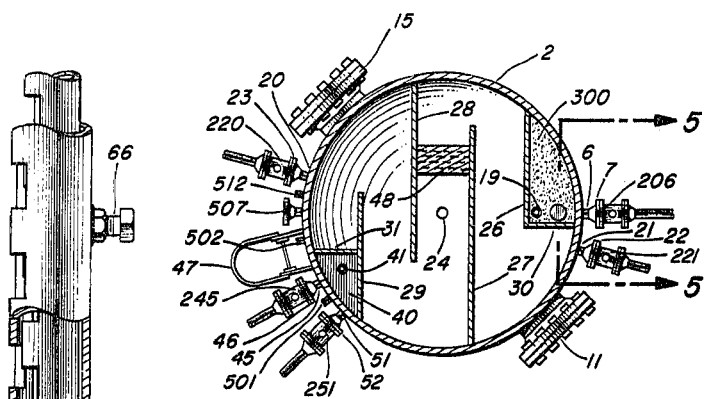
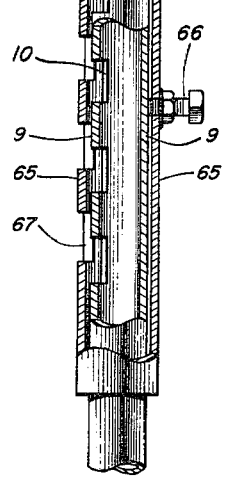
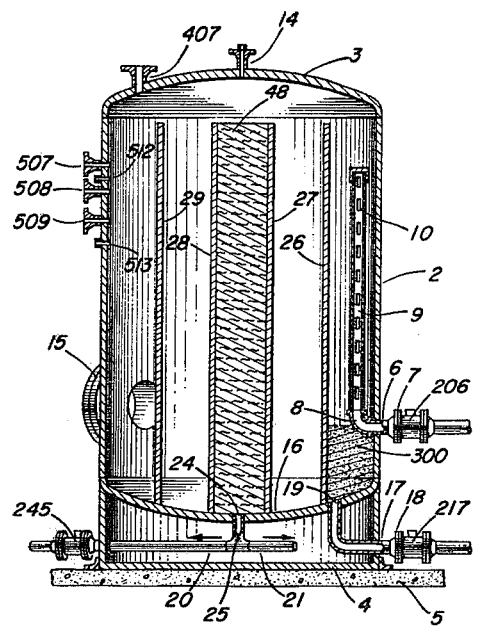
FIG. 3
FIG. 5
FIG. 4

INTERNALLY BAFFLED, HORIZONTAL FLOW, VERTICAL OIL SKIMMER

This is a division of application Ser. No. 890,773, filed Apr. 21, 1978 now abandoned.

BACKGROUND OF THE INVENTION

1. Field of the Invention

The invention relates to an apparatus and process for the separation and removal of oil from mixtures of oil and water. In a more particular aspect, it relates to separation of oil and particulate solids from oily and dirty water mixtures produced concurrently with oil on offshore platforms.

2. Brief Description of the Prior Art

Commonly called skimmers or settling tanks, most separators employed to remove oil from oil and water mixtures produced in association with the production of petroleum are of either a horizontal or vertical cylindrical configuration and are often installed upstream of a final water polishing apparatus, particularly on offshore platforms.

Such skimmers are essential to remove oil from the produced water for environmental and conservation reasons. For example, if the produced water is to be discharged in the sea, environmental and conservation considerations dictate that the oil entrained therein be removed. It is essential that a substantial portion of the oil be removed from such oil and water mixtures to avoid overloading polishing apparatus which further purifies the water.

Presently available skimmers have horizontal flow in horizontal vessels with few or no internal devices, or they have vertical downflow in vertical vessels. Horizontal flow vessels are more effective than the vertical flow vessels since the flow of the fluids is perpendicular to the oil droplet rise, and does not counteract it. However, particularly for offshore use, the horizontal vessel requires considerably more of extremely scarce and expensive deck space than the vertical designs, and is more prone to internal mixing due to movement of the production vessel or platform.

Presently available vertical skimmer vessels generally have the inlet near the top and the water outlet near the bottom. The downward flow in such vessels results in a water velocity which directly opposes oil droplet flotation tendency, consequently requiring more retention time and a much larger vessel which in turn takes up more space than if the flow were horizontal.

The oil and water mixtures requiring separation in association with the production of oil also will often have heavy loads of particulate solids such as dirt and sand of various sizes. With the presently available vertical vessels, the solids entering at the top fall through the vessel's contents to the bottom, stirring the contents and carrying oil droplets back into suspension or carrying the oil droplets near or through the water outlet.

One advantageous approach to the problems with presently available equipment hereinabove outlined is disclosed in U.S. Pat. No. 3,933,654 which discloses an oil separator wherein the inlet flows the oil-water mixture into a quiescent zone with upwardly and horizontally diagonal flow through a coalescing section with recovery of the oil through an outlet and recovery of the water after passing through a vertically circuitous route defined by baffles and then through an outlet. However, though the disclosure of U.S. Pat. No. 3,933,654 offers some advantage over conventional horizontal skimmer design or over conventional vertical skimmer design, it does not anticipate nor suggest the unexpectedly superior results obtained in accordance with the present invention.

OBJECTS OF THE INVENTION

An object of the invention is to provide a process and apparatus for the separation of oil from mixtures of oil and water.

A further object of the invention is to provide a process and apparatus for the separation of oil and particulate solids from mixtures of oil, water, and particulate solids.

SUMMARY OF THE INVENTION

An internally baffled, horizontal flow, vertical oil separator is useful for separation of oil from a mixture of oil and water. The separator comprises a vertically elongated vessel having an inlet for an oil and water mixture on one vertical side, a means for recovering oil from the surface of the water and an outlet for the recovered oil in fluid communication with the recovery means, a water outlet substantially below the oil outlet, and baffles internal in the vessel and between the inlet and the outlets; such that the oil and water must flow in a substantially horizontal direction, such that the horizontal direction of flow is changed by a total of at least 360° between the inlet and the outlets such that the average horizontal distance of the fluid flow is at least three times the average horizontal distance between the inlet and the outlets, and such that separation of the oil and water mixture can occur during the horizontal flow to form an upper oil and a lower water layer.

In one aspect, the vessel can have a trap below the inlet adapted for retention of particulate solids settling from the horizontally flowing fluids.

In another aspect, the separator can have a fluid distributor in fluid communication with the inlet so that the fluids are distributed over the vertical interval of the horizontally flowing fluid cross-section.

In yet another aspect, the separator can have a coalescing medium mounted between the baffles such that the horizontal fluid flow must pass therethrough to enhance separation.

BRIEF DESCRIPTION OF THE DRAWINGS

FIG. 3 shows a horizontal cross-section along Plane 3—3 of the separator view shown in FIG. 1.

FIG. 4 shows a vertical cross-section along Plane 4—4 of the separator view shown in FIG. 2.

FIG. 5 shows in vertical cross-section along Plane 5—5 as shown in FIG. 3 a preferred embodiment of a vertical oil distributor for inletting within the separator.

DETAILED DESCRIPTION OF THE DRAWINGS

FIGS. 1 through 8 described according to the brief description of the drawings heretofore provided illustrate a presently preferred mode of the vertical oil separator of the invention. The same numbers are employed to refer to the same features in FIGS. 1 through 8.

Figure 1:
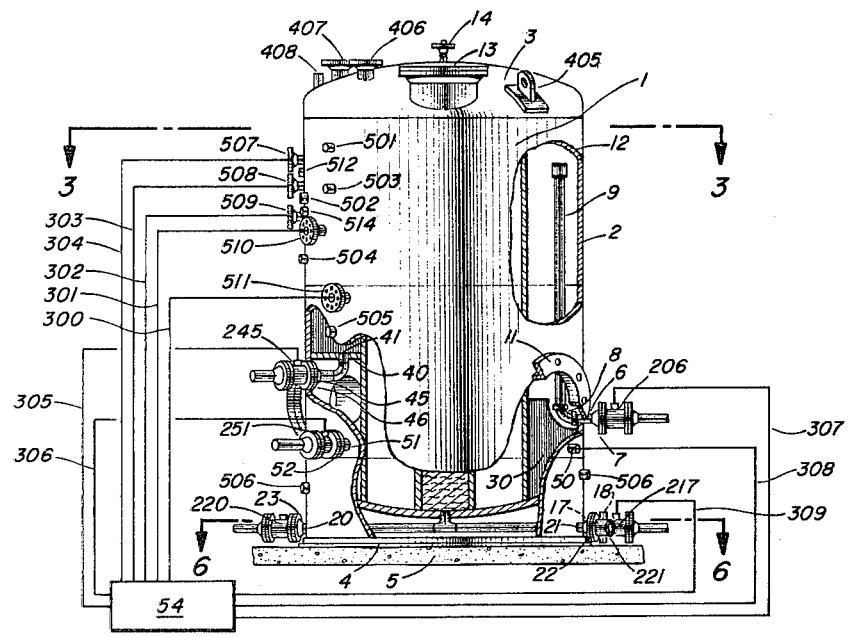
FIG. 1 shows a partially schematic side view of the vertical oil separator of the invention having cutaways to show certain internal features.
Figure 6:
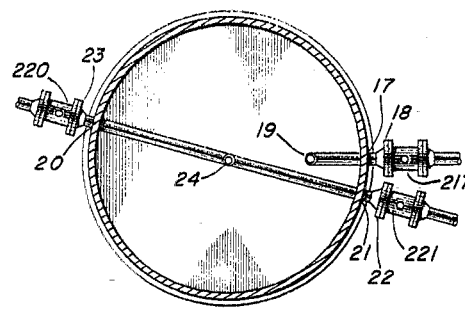
FIG. 6 shows a horizontal cross-section along Plane 6—6 of the separator view shown in FIG. 1.

Thus, referring to FIG. 1 (and also to FIGS. 2 through 8 where appropriate), the following detailed description is provided.

A vertical oil separator useful for separation of oil from a mixture of oil and water comprises a vertically elongated separator vessel 1 fabricated of a cylindrically joined vertical side wall 2 having a semihemispheroid shaped top 3 and a semihemispheroid shaped bottom 16 joined as by welding in fluid-type relationship to form a fluid-tight vessel and supported on base 4 which in turn is supported by supporting medium 5 which can be a deck member, a concrete pad, or the like.

As shown in FIG. 1 and appropriately in the other figures, the separator vessel 1 has an inlet 6 for the oil-water-sand mixture to be separated joined in fluid-tight relationship in the vertical side 2 of the vessel and connected by an ell 8 to a vertical fluid distributor 9 for input of the oil-water-sand mixture into the separator as shown through open hatch 11 (open for illustration purposes only) and cutaway 12. The distributor 9 has slots 10 for passage of the mixture into the vessel (shown in FIG. 4). The inlet 6 is joined by means of connector flange 7 through electrically controlled valve 206 to the input source of the oil-water-sand (not shown). The separator has another access hatch 13 in the top and a third access hatch 15 (illustrated only in FIGS. 2, 3 and 4). The bottom 16 has an opening 24 leading through tee 25 (shown in FIG. 4) outwardly through outlets 20 and 21 through flanges 22 and 23 and thence through valves 221 and 220 to plumbing suitable for flushing or draining the vessel (not shown).

Figure 7:
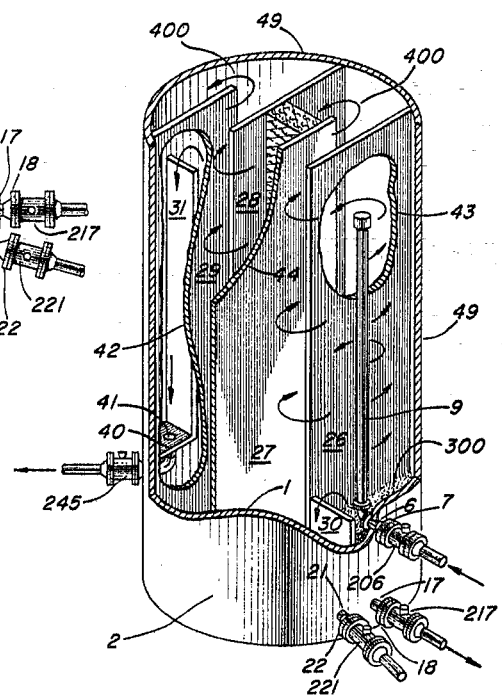
FIG. 7 shows a semi-schematic third dimensional perspective of the separator shown in FIG. 1 et al with selected cutaways to better show the internal spatial configuration of the baffles and certain other parts of the separator.

As best visualized in FIG. 7, interior baffles 26 and 30, which are joined to each other, the bottom of the vessel, and to the vertical side of the vessel 2, form a trap for sand 300 which settles to the bottom of the trap during operation. It should be noted that baffle 26 (as well as baffles 27, 28, and 29) extends above the surface of the oil and water while baffle 30 extends upward only sufficiently to form a sand trap.

An opening 19 (best shown in FIG. 4) near the lowest point of the thus-formed trap is connected through outlet 17 and connector flange 18 through electrically controlled valve 217 (best shown in FIG. 1) to disposal plumbing for the particulate solids (not shown). As shown in FIG. 1, electrically controlled valve 217 is controlled by way of electrical line 309 by controller 54 which is connected by electrical line 308 to sensor 50 such that when the collection of solids reaches a predetermined level, the sensor 50 detects this and controller 54 opens the valve 217 to dump the accumulated solids.

Referring now principally to FIG. 7, and supplementary to the other figures as appropriate, the separator has vertical baffles 26, 27, 28, and 29 joined appropriately to the vertical side 2 as shown and to the bottom in fluid-tight relationship such as to define a circuitous path for the fluids moving from the inlet distributor 9 as illustrated by arrows 400 in a substantially horizontal direction such that the horizontal direction of flow is changed by a total of at least 360° between the inlet and the outlets, such that the average horizontal distance of the fluid flow is at least three times the average horizontal straight line distance between the inlet and the outlets and such that the oil separates to form a layer on top of the water prior to reaching the zone between the unjoined side of baffle 29 and the nearest approach of vertical side 2. According to one presently preferred embodiment, the average depth of the cross-section of horizontal flow is greater than the average width of the cross-section of the horizontal fluid flow and it may be at least twice as much.

As heretofore pointed out, sand or other particulate solids settle in the trap principally defined by baffle 26 and baffle 30. Cutaway 49 in vertical side 2, cutaway 42 in baffle 29, cutaway 44 in baffle 27, and cutaway 43 in baffle 26 are employed only to better show the spatial relationship of the features of the separator.

Baffle 31 vertically joined to baffle 29 and side 2, and on the bottom to baffle 40 having outlet opening 41, forms a sump means for recovering oil which has risen to the surface of the water and passes over a weir defined by the upper edge of baffle 31.

Figure 2:
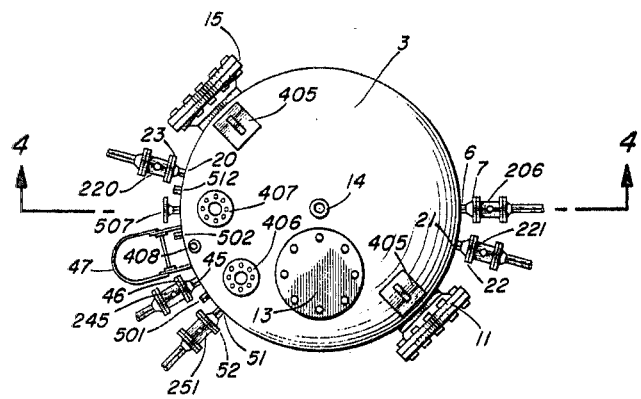
FIG. 2 shows a top view of the separator shown in FIG. 1.

Referring now principally to FIG. 1 and FIG. 2, opening 41 to outlet 45 is joined by connector flange 46 through electrically controlled valve 245 to recovery means for the oil (not shown).

Still referring principally to FIGS. 1 and 2, electrically controlled valve 245 which is employed to control the oil level is controlled by controller 54 by means of electrical line 305. Controller 54 is connected by lines 304, 303, 302, 301, and 300 to sensors 507, 508, 509, 510, and 511 respectively which feed data pertaining to respectively high liquid level shutdown, water level control, low liquid level shutdown, oil level control, and oil level shutdown.

Controller 54 maintains oil and water levels within proper bounds by means of controlling input rate of oil-water mixture through inlet 6 by means of valve 206 connected to the controller by electrical line 307; by means of controlling oil output rate through outlet 45 by means of valve 245 connected to the controller by means of electrical line 305; and by means of controlling water output through water outlet 51 flanged to electrically controlled valve 251 by means of flange 52 with electrical contact to the valve 251 by means of electrical line 306.

A high level gauge glass (not shown) is connected to gauge glass connections 501 and 502, an intermediate level gauge glass (not shown) is connected to gauge glass connectors 512 and 513, an oil gauge glass (not shown) is connected to gauge glass connectors 503 and 505, and a low level gauge glass (not shown) is connected to gauge glass connectors 504 and 514. The gauge glasses (not shown) which are connected to the connectors for monitoring and checking on conditions in the separator are conventional gauge glasses from the Daniel Company available as off-the-shelf catalog items.

Vent holes 506 are located in the side 2 below the bottom 16.

Pressure pilot 408 and relief valves 406 and 407 as well as lifting eyes 405 are useful in operation and placement of the separator.

A gas outlet 14 is shown at the top of the vessel.

Ladder and guardrail 47 are shown in FIGS. 2 and 3.

Referring now principally to FIG. 5, vertical oil-water distributor 9 having slots 10 is controllable as to output velocity and volume by means of a collar 65 slideably mounted thereon having slots 67 alignable with slots 10 by vertical and/or horizontal orientation such as to form varying size opening slots by adjustment settable by set screws 66.

A coalescing medium 48 can be affixed between the baffles as shown in FIGS. 3 and 4 to coalesce finely divided oil droplets into larger droplets and aid in gravity separation. Preferably, it is mounted such that substantially all of the liquids pass through it.

Figure 8:
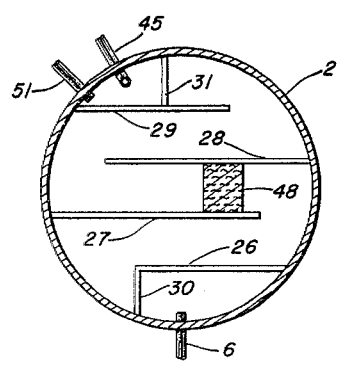
FIG. 8 is a schematic top view showing the horizontal spatial relationship of inlet, outlet, baffles, and coalescer in a separator similar to that shown in FIGS. 1 through 7.

FIG. 8 is a schematic top view showing the horizontal spatial relationship of inlet, outlet, baffles, and coalescer in a separator similar to that shown in FIGS. 1 through 7. The same numbering scheme is employed as in the earlier figures.

FIGS. 9, 10, 11, 12, 13, and 14 are top view schematics analogous to FIG. 8 illustrating the horizontal spatial relationship of inlet, outlet, baffles, and coalescer in alternate modes of the invention.

Figure 9:
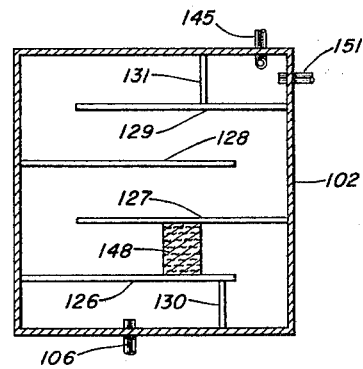
FIGS. 9, 10, 11, 12, 13, and 14 are top view schematics analogous to FIG. 8 illustrating certain alternative embodiments of the invention.

Thus, referring to FIG. 9, 106 is the inlet, 130 is a baffle analogous to baffle 30, and baffle 126 is a baffle analogous to baffle 26. Coalescing section 148 is analogous to coalescing section 48 in FIG. 8. In like manner, vertical side section 102 is analogous to 2, baffles 127, 128, and 129 are analogous to baffles 27, 28, and 29, baffle 131 is analogous to baffle 31, oil outlet 145 is analogous to oil outlet 45, water outlet 151 is analogous to water outlet 51.

Figure 10:
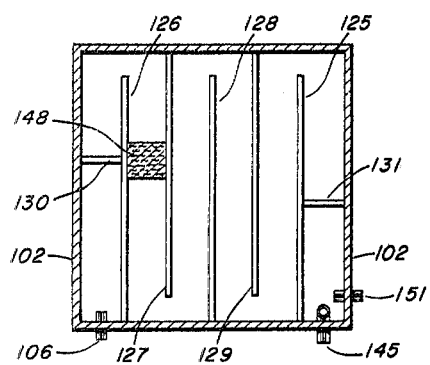

FIG. 10 illustrates yet another embodiment wherein the numbering employed is analogous to the numbering employed in FIG. 9.

Figure 11:
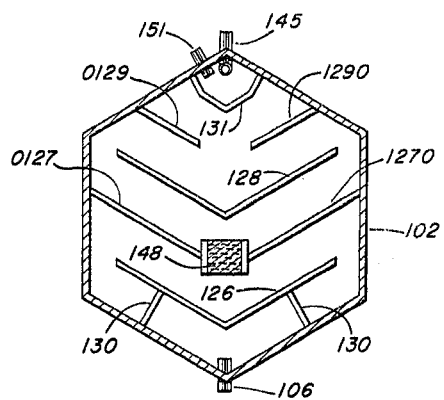

FIG. 11 shows yet another embodiment wherein the same numbering is employed to refer to analogous features except that baffles 0127 and 1270 as well as baffles 0129 and 1290 are analogous to baffles 127 and 129, respectively in FIGS. 9 and 10.

Figure 12:
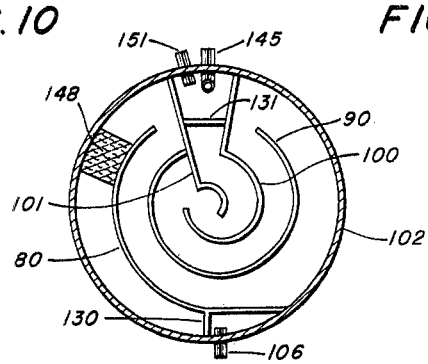

FIG. 12 shows yet another embodiment wherein analogous figures are numbered the same except that baffles 80, 90, 100, and 101 are employed instead of baffles 126, 127, 128, and 129, as in FIGS. 8, 9, and 10.

Figure 13:
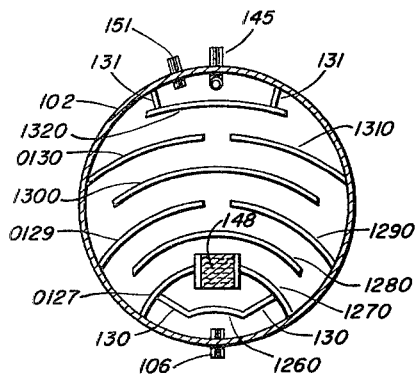
Figure 14:
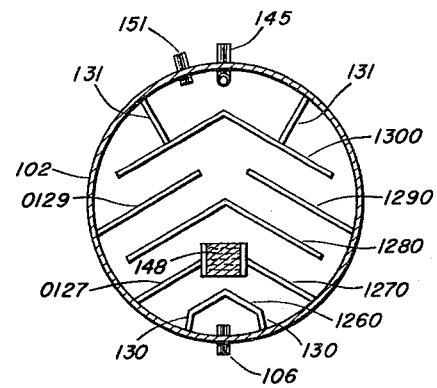

FIGS. 13 and 14 show yet other modes having the same numbering referring to analogous features except that baffles 126, 127, 128, and 129 are replaced by baffles 1260, 1270, 0127, 1280, 1290, 0129, 1300, 1310, 0130, and 1320, as illustrated.

PREFERRED EMBODIMENTS OF THE INVENTION

Referring principally to FIG. 7 and supplementary to FIGS. 1, 2, 3, 4, 5, 6, and 8 as appropriate, the operation of the separator is described as follows. Oil-water-sand mixture flows through inlet 6 into separator vessel 1 through slots 10 of vertical fluid distributor 9 in a direction aimed at the curved vertical side wall 2 approximate to baffle 26.

Sand 300 settles out in the trap formed by baffle 30 and baffle 26. Baffle 30 extends upward only sufficiently to form a trap for the sand which settles. Periodically, the sand and other particulates are removed from the trap formed by baffles 30 and 26 through outlet 17.

Following liquid input through vertical fluid distributor 9, the liquids flow in the general direction indicated by arrows 400, first reversing the direction of flow from the direction inputted into the separator, then flowing around the edge of baffle 26, then through the passageway between baffle 26 and 27 around the edge of baffle 27, then through the passageway of baffle 27 and 28 around the edge of baffle 28, and then through the relatively large quiescent zone generally defined between baffle 28 vertical side 2 and baffle 29 and generally outward from the projecting end of baffle 29. By this time, separation has occurred.

The oil is recovered over the weir formed by the upper edge of baffle 31 into an oil recovery trap defined by horizontal sides including baffle 31, baffle 29, and vertical side 2 along with bottom baffle 40. The oil is removed by the thus-defined sump by way of opening 41 through outlet 45.

The water which is separated is removed from the separator by way of water outlet 51.

In one presently preferred mode, a coalescing medium 48 is mounted in the separator such that the oil-water mixture passes therethrough. The coalescer causes coalescence of the oil droplets and promotes separation. Any of a number of conventional coalescing materials can be employed in the coalescer such as open cell polyurethane foam, polyester fibers, polyethylene fibers, polypropylene ribbons, vinyl fibers, particulate ion exchange resins, and the like.

The oil and water levels and operation of the separator can be automatically controlled by sensors and controllers as described heretofore. Such sensors and controls are conventional items well known to those skilled in the art and are generally available as off-the-shelf items.

The automatic control system employing electrically controlled valves, the controller, and the sensors is desirable, but the separator can be operated manually if so desired, even though it would not normally be economically feasible to do so.

According to another presently preferred mode, pneumatic controllers and valves are employed to automatically control the operation of the separator.

When the skimmer is employed in association with hydrocarbon production, it is often advantageous to let incoming fluid rates vary in accord with optimum well production and/or liquid control on upstream processing equipment.

When pneumatic controllers and valves are employed, pressurized natural gas available from the production is a suitable and convenient working fluid in the pneumatic system.

In one embodiment and mode of operation, 30 psig natural gas is passed to a level controller which, in response to a sensor for the water-oil level interface in the separator vessel, controls a pneumatically operated water outlet valve. In accord with a pneumatically controlled embodiment, a supply of 30 psig natural gas is passed to a bi-level shutdown controller, which in response to a sensor for total upper liquid level in the separator rising beyond a predetermined level, shuts off gas pressure to a safety control system allowing bleed-down and shut-in of the safety shut-down.

In such pneumatic control systems, conventional pneumatic control items are employed.

Certain other features are shown in the drawings, the purpose for and operation of which is apparent from the description heretofore provided.

The separator can be fabricated of conventional materials such as plate steel by conventional methods such as welding and the like.

Though the invention has been described in terms of separating mixtures of oil-water-sand, it is readily apparent and the scope of the invention is intended to cover separation of mixtures of two immiscible liquids having different densities. Provision is also provided for optionally separating particulate solids from such mixtures of immiscible liquids if such separation of particulate solids is necessary or desirable.

Thus, it is readily seen that the invention is useful in separating mixtures of immiscible liquids in a number of industrial applications as well as in the separation of petroleum liquids from brines or water in accordance with the embodiments and modes described herein.

The following example is provided of operation of a skimmer such as described in FIGS. 1 through 8 in separating oil from water on a platform in the Gulf of Mexico. However, it is to be understood that the operation is exemplary only, and should not be construed as limiting of the invention as described and claimed herein.

Over a period of runs extending over many days, infrared analysis on input fluids versus water removed from the skimmer indicates that a large proportion of the oil is consistently removed therefrom.

I claim:

1. An internally baffled, horizontal flow, vertical oil separator useful for separation of and recovery of separated oil and water from a mixture comprised of oil which is less dense than water and water comprising a vertically elongated vessel having:
   (a) an inlet for the oil and water mixture on a first vertical side,
   (b) a means for recovering oil from the surface of the water and an outlet for the recovered oil in fluid communication with the recovery means;
   (c) a water outlet substantially below the oil recovery means for recovery of water, and
   (d) baffle means internal in the vessel and between the inlet and the outlets for defining a flow path in which the oil and water mixture must flow in a substantially horizontal direction and the horizontal direction of the liquid flow is changed by a total of at least 360° between the inlet and the outlets and the average horizontal distance of the liquid flow is at least three times the average horizontal straight line distance between the inlet and the outlets and separation of the oil and water mixture occurs during the horizontal flow to form an upper oil layer from which oil is recovered via the oil recovery means and a lower water layer from which water is recovered via the water outlet and the average depth of the cross-section of the horizontal liquid flow is greater than the average width of the cross-section of the horizontal liquid flow, and the depth of the liquid in the separator is greater than any horizontal dimension of the separator; wherein the inlet is in fluid communication with a vertical distributor for the oil and water mixture having a plurality or orifices arrayed over the vertical liquid interval of the vessel to input the oil and water mixture over substantially the entire vertical interval; wherein the mixture comprised of oil and water also comprises particulate solids which are more dense than the oil or water; and wherein the vessel has a trap below the inlet for retention of particulate solids settling from the horizontally flowing liquids; wherein the orifices face substantially in a horizontal direction toward said first vertical side and opposite from the horizontal direction of the liquid flow past the vertical distributor, wherein the vertically elongated vessel is of a cylindrical shape, wherein the oil recovery means comprises a weir having a sump space therebelow and an oil outlet from the sump space to the exterior of the vessel, wherein the water outlet is controlled by a valve means which in turn is controlled by water level sensors operatively connected thereto, and wherein the oil outlet is controlled by a valve means situated therein which is controlled by oil level sensors operatively connected thereto.

2. The separator of claim 1 wherein a coalescing medium is mounted between said baffle means such that the horizontal liquid flow must pass therethrough.

* * * * *